United States Patent
Ho et al.

(10) Patent No.: US 10,506,284 B2
(45) Date of Patent: Dec. 10, 2019

(54) VISUAL UTILITY ANALYTIC METHOD AND RELATED EYE TRACKING DEVICE AND SYSTEM

(71) Applicant: ACER INCORPORATED, New Taipei (TW)

(72) Inventors: Andy Ho, New Taipei (TW); Tsung-Han Yang, New Taipei (TW); Szu-Chieh Wang, New Taipei (TW); Jian-Chi Lin, New Taipei (TW); Jason Hsiao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/935,048

(22) Filed: Mar. 25, 2018

(65) Prior Publication Data
US 2019/0052933 A1    Feb. 14, 2019

(30) Foreign Application Priority Data
Aug. 9, 2017   (TW) .............................. 106126864 A (51) Int. Cl.
*H04N 21/442*  (2011.01)
*H04N 21/466*  (2011.01)
*H04N 21/44*   (2011.01)

(52) U.S. Cl.
CPC .  *H04N 21/44218* (2013.01); *H04N 21/44008* (2013.01); *H04N 21/4667* (2013.01)

(58) Field of Classification Search
CPC ......... H04N 21/4667; H04N 21/44218; H04N 21/44008; H04N 21/4532; H04N 21/25891; H04N 21/251; H04N 21/4223; H04N 21/4755; H04N 21/4728
USPC .......................................................... 725/10
See application file for complete search history.

(56) References Cited

U.S. PATENT DOCUMENTS

| | | | | |
|---|---|---|---|---|
| H2282 H | * | 9/2013 | Squire ..................... | G09B 5/06 348/211.11 |
| 2002/0116516 A1 | * | 8/2002 | Pedersen ................. | G06F 3/011 709/231 |
| 2004/0156020 A1 | * | 8/2004 | Edwards ................. | G06F 3/013 351/209 |
| 2010/0092929 A1 | * | 4/2010 | Hallowell ................ | G09B 5/06 434/167 |

(Continued)

FOREIGN PATENT DOCUMENTS

| | | |
|---|---|---|
| CN | 103645806 A | 3/2014 |
| CN | 106920129 A | 7/2017 |

(Continued)

*Primary Examiner* — Cynthia M Fogg
(74) *Attorney, Agent, or Firm* — Winston Hsu (57) ABSTRACT

A visual utility analytic method for an eye tracking system includes dividing each of a plurality of film segments into at least one display area, wherein each of the plurality of film segments corresponds to at least one display target, and the at least one display target respectively corresponds to one of the at least one display area; and comparing the display area corresponding to the at least one display target in the plurality of film segments with a watched area corresponding to each of a plurality of eye tracking detection results to determine a plurality of visual utilities of the at least one display target in the plurality of film segments.

19 Claims, 4 Drawing Sheets

(56) References Cited

U.S. PATENT DOCUMENTS

| | | | |
|---|---|---|---|
| 2011/0242486 A1* | 10/2011 | Ebisawa | G06F 3/013 |
| | | | 351/206 |
| 2011/0298702 A1* | 12/2011 | Sakata | G06F 3/013 |
| | | | 345/156 |
| 2012/0146891 A1 | 6/2012 | Kalinli | |
| 2012/0317594 A1* | 12/2012 | Thorn | H04N 5/607 |
| | | | 725/18 |
| 2013/0080974 A1 | 3/2013 | Suzuki | |
| 2013/0091515 A1* | 4/2013 | Sakata | H04N 17/04 |
| | | | 725/10 |
| 2013/0205314 A1* | 8/2013 | Ramaswamy | H04N 21/44213 |
| | | | 725/14 |
| 2014/0007148 A1* | 1/2014 | Ratliff | H04N 21/251 |
| | | | 725/12 |
| 2014/0168056 A1 | 6/2014 | Swaminathan | |
| 2015/0130705 A1 | 5/2015 | Im | |
| 2015/0245103 A1* | 8/2015 | Conte | H04N 21/47815 |
| | | | 725/60 |
| 2015/0279418 A1* | 10/2015 | Laksono | G11B 20/10527 |
| | | | 386/248 |
| 2016/0260143 A1* | 9/2016 | Ekambaram | G06K 9/00302 |
| 2017/0124399 A1* | 5/2017 | Bostick | G06K 9/00744 |
| 2017/0214951 A1 | 7/2017 | Chang | |
| 2018/0300096 A1* | 10/2018 | Asperheim | G06F 3/013 |

FOREIGN PATENT DOCUMENTS

| | | |
|---|---|---|
| TW | M518370 U | 3/2016 |
| TW | 201636957 A | 10/2016 |

\* cited by examiner

VISUAL UTILITY ANALYTIC METHOD AND RELATED EYE TRACKING DEVICE AND SYSTEM

BACKGROUND OF THE INVENTION

1. Field of the Invention

The present invention relates to a visual utility analytic method and related eye tracking device and system, and more particularly, to a visual utility analytic method and related eye tracking device and system capable of evaluating the visual utility of a display target based on reactions of the viewer.

2. Description of the Prior Art

Eye tacking technique can detect a viewer's eye motion (e.g., gazing time, order of gazing points, pupil dilation, and so on) to track a gazing target of the viewer. In practice, the eye tracking device may be applied in evaluation of visual utility for recording watched data when the viewer is watching web pages, advertisements or films, to find out a display target that is mostly watched by the viewer, so as to evaluate its visual utility (e.g., visual contribution and popularity of the display target).

For example, a movie maker may evaluate the visual contribution and the popularity of an acting personnel in a movie to determine payment for the acting personnel; or, perform image composition analytic to the film according to viewer's watching habits. An advertiser may evaluate the effect of embedded advertising based on the visual contribution and popularity of a commercial product in the film to determine sponsorship amount; or, determine a placement of the commercial product in the screen of the film according to viewer's watching habits. In addition, the visual utility analytic may be used for selecting the key segment (or story plot) in the film as the basis of film editing; for example, an editor may keep the key segments (or story plots) in the raw footage and remove less viewed segments to ensure the popularity of the film.

Therefore, how to provide a visual utility analytic method and related eye tracking system for analyzing the visual utility of the display target (e.g., acting personnel and commercial product) in the film has become a topic in the industry.

SUMMARY OF THE INVENTION

It is therefore an objective of the present invention to provide a visual utility analytic method and related eye tracking device and system for analyzing the visual utility of a display target in a film.

The present invention discloses a visual utility analytic method for an eye tracking system, wherein the eye tracking system comprises a screen and an eye detecting device. The method includes dividing each of a plurality of film segments into at least one display area, wherein each of the plurality of film segments is corresponding to at least one display target, and the at least one display target respectively corresponds to one of the at least one display area; determining a plurality of display areas corresponding to the plurality of eye tracking detection results according to a plurality of eye tracking detection results generated by the eye detecting device; and comparing the at least one display area corresponding to the at least one display target in the plurality of film segments with the plurality of display areas corresponding to the plurality of eye tracking detection results, to determine a plurality of visual utilities of the at least one display target in the plurality of film segments.

The present invention further discloses an eye tracking system for performing visual utility analytic process. The eye tracking system includes a screen for displaying a plurality of film segments, wherein each of the plurality of film segments is corresponding to at least one display target, and the at least one display target respectively corresponds to one of the at least one display area; an eye detecting device for respectively generating a plurality of eye tracking detection results when the screen is playing the plurality of film segments; and a processing device coupled to the screen and the eye detecting device, for performing a visual utility analytic process according to the plurality of film segments and the plurality of eye tracking detection results, to determine a plurality of visual utilities. The process includes dividing each of a plurality of film segments into at least one display area; determining a plurality of display areas corresponding to the plurality of eye tracking detection results according to a plurality of eye tracking detection results generated by the eye detecting device; and comparing the at least one display area corresponding to the at least one display target in the plurality of film segments with the plurality of display areas corresponding to the plurality of eye tracking detection results, to determine a plurality of visual utilities of the at least one display target in the plurality of film segments.

The present invention further discloses an electronic device for an eye tracking system, for performing visual utility analytic process, wherein the eye tracking system comprises a screen and an eye tracking device. The electronic device includes a processing device; and a memory device coupled to the processing device for storing a program code, wherein the program code instructs the processing device to perform a visual utility analytic process according to a plurality of film segments displayed by the screen and a plurality of eye tracking detection results generated by the eye tracking device to determine a plurality of visual utilities. The process includes dividing each of a plurality of film segments into at least one display area, wherein each of the plurality of film segments is corresponding to at least one display target, and the at least one display target respectively corresponds to one of the at least one display area; determining a plurality of display areas corresponding to the plurality of eye tracking detection results according to a plurality of eye tracking detection results generated by the eye detecting device; and comparing the at least one display area corresponding to the at least one display target in the plurality of film segments with the plurality of display areas corresponding to the plurality of eye tracking detection results, to determine a plurality of visual utilities of the at least one display target in the plurality of film segments.

The eye tracking system of the present invention can compare whether the display area of the display target is same as the watched area of viewer to evaluate the visual utility of the display target (e.g., acting personnel, commercial product and story plot) in the film based on viewer's direct responses, so the film maker and the advertiser can make reference to the visual utility to evaluate the popularity and the contribution of the display target.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
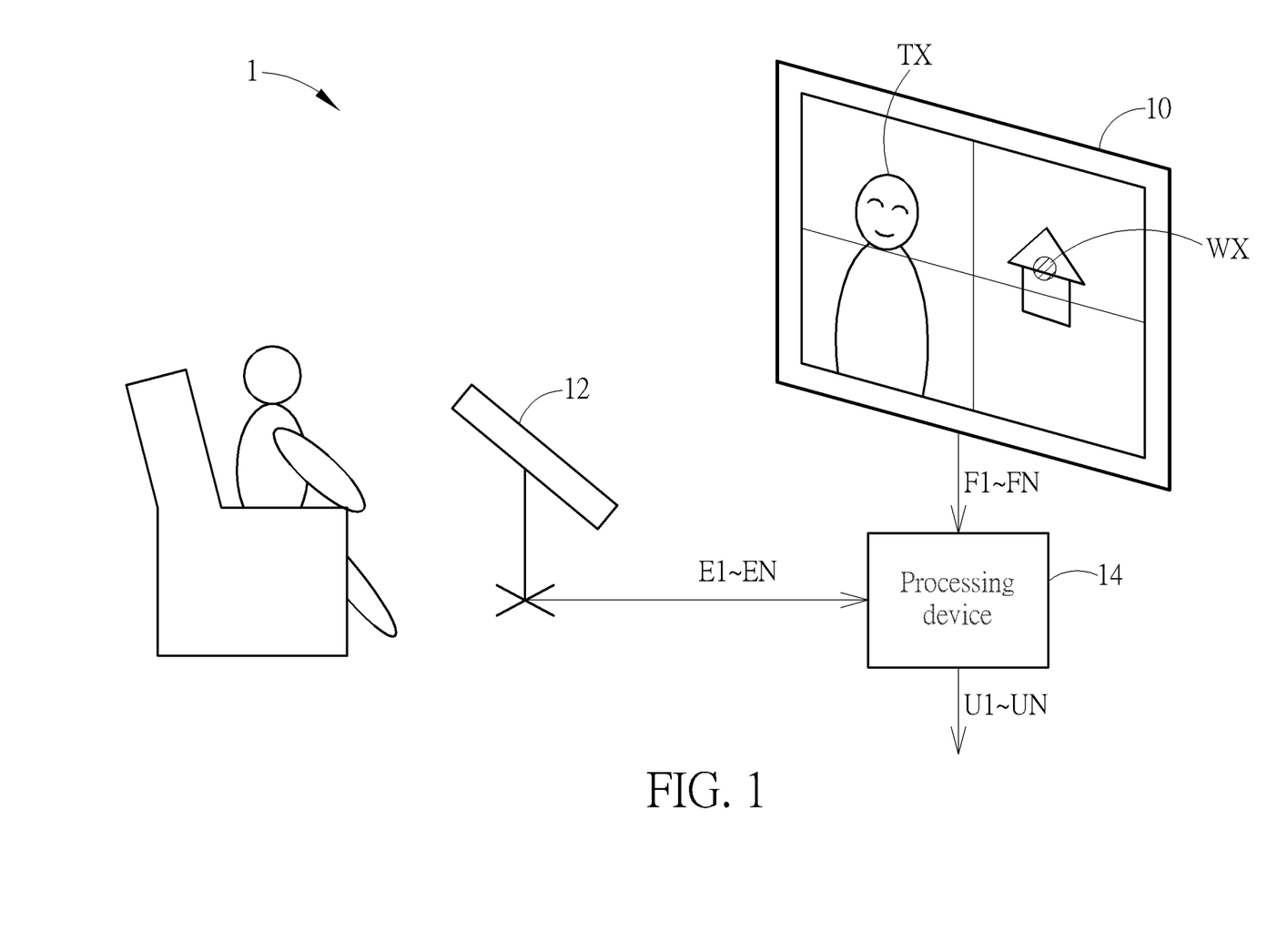
FIG. 1 is a schematic diagram of an eye tracking system according to an embodiment of the present invention.

FIG. 1 is a schematic diagram of an eye tracking system 1 according to an embodiment of the present invention. The eye tracking system 1 includes a screen 10, an eye detecting device 12 and a processing device 14. The eye tracking system 1 may be used in a movie theater or an audio-visual room for gathering watched data of viewers in each film segments in a film, and combining locations of a display target (e.g., acting personnel, commercial product and so on) in each film segments to analyze the visual utility and popularity of the display target in the film.

As shown in FIG. 1, take the movie theater for example, the eye detecting device 12 may be disposed between a seat of the viewer and the screen 10 and used for tracking the eye motion of the viewer (e.g., watched time, moving positions, and pupil dilation of the eye). The screen 10 may be a display device (e.g., television, projector and curtain) for displaying a film, the film includes a plurality of film segments F1-FN, wherein each of the plurality of film segments F1-FN includes at least one display target TX.

The eye detecting device 12 is used for respectively generating a plurality of eye tracking detection results E1-EN when the screen 10 is playing the plurality of film segments F1-FN, wherein the plurality of eye tracking detection results E1-EN corresponds to a plurality of watched coordinates W1-WN.

The processing device 14 is coupled to the screen 10 and the eye detecting device 12, and used for determining a plurality of visual utilities U1-UN of the at least one display target TX in the film segments F1-FN according to plurality of film segments F1-FN and a plurality of eye detection results E1-EN. In detail, take a film segment FX and a corresponding eye detection result EX for example, the processing device 14 may determine a display area corresponding to the display target TX according to a display coordinate of the display target TX on the screen 10 in the film segment FX, and determine the watched area corresponding to the watched coordinate WX according to the watched coordinate WX corresponding to the eye detection result FEX. The processing device 14 may compare the display area corresponding to the display target TX with the watched area corresponding to the watched coordinate WX to determine a visual utility UX of the display target TX. For example, when the display area corresponding to the display target TX is same as the watched area corresponding to the watched coordinate WX, the visual utility UX of the display target TX is valid; on the contrary, when the display area corresponding to the display target TX is different from the watched area corresponding to the watched coordinate WX, the visual utility UX of the display target TX is invalid. Based on the statistics of valid and invalid rates of the visual utilities U1-UN, a total watched rate of the display target TX in the film segments F1-FN can be obtained.

Therefore, the eye tracking system 1 may evaluate the visual utility of the display target based on viewer's direct responses, which allows the film maker to make reference to the visual utility to evaluate the popularity and the contribution of the display target.

In one embodiment, due to the human eyes can watch a visual range, the plurality of eye tracking detection results E1-EN may correspond to a plurality of watched coordinate ranges. In one embodiment, the processing device 14 may be an independent electronic device, or integrated with the screen 10 or the eye detecting device 12.

Figure 2:
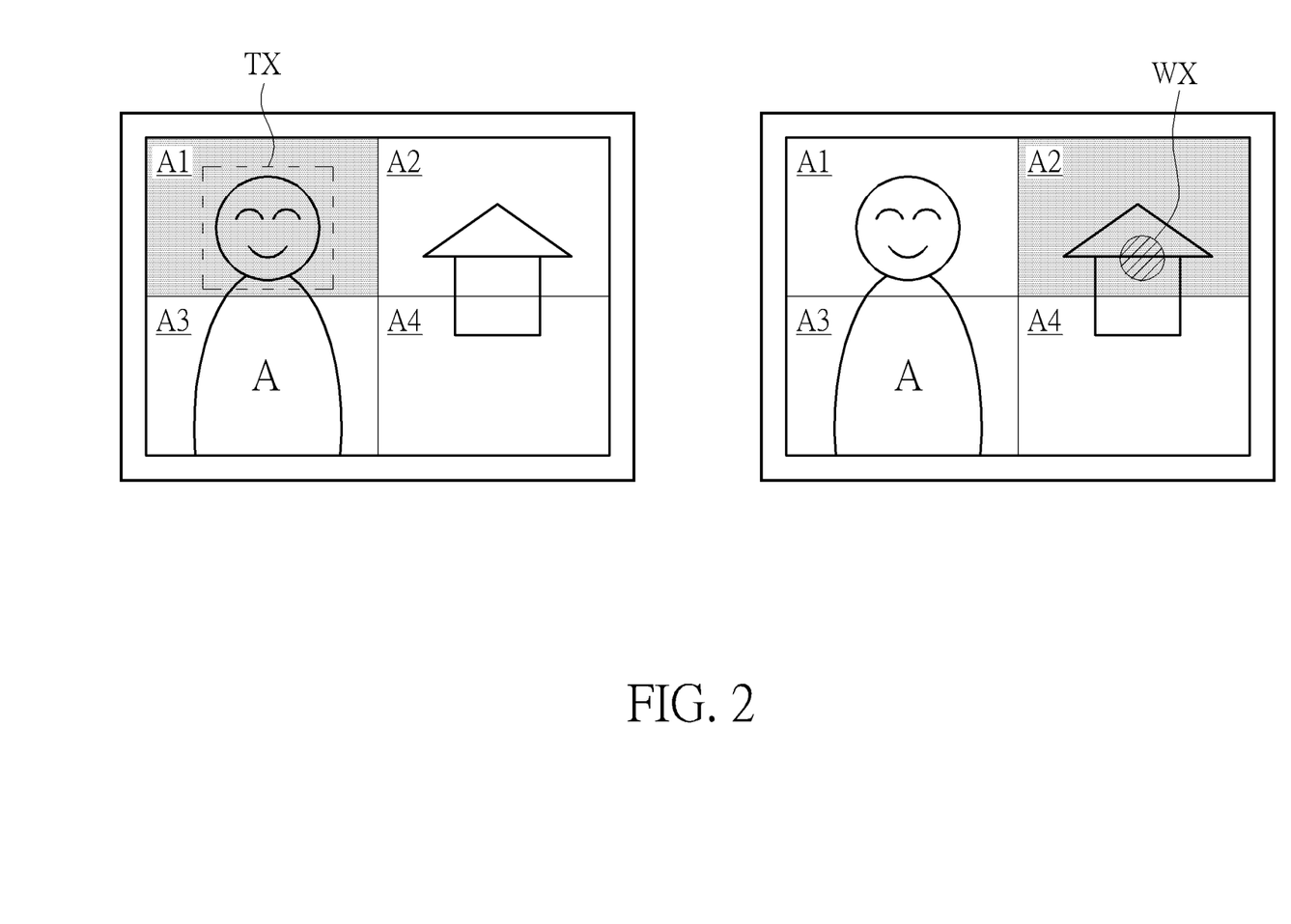
FIG. 2 illustrates an operating context of the eye tracking system in FIG. 1 according to an embodiment of the present invention.
Figure 3:
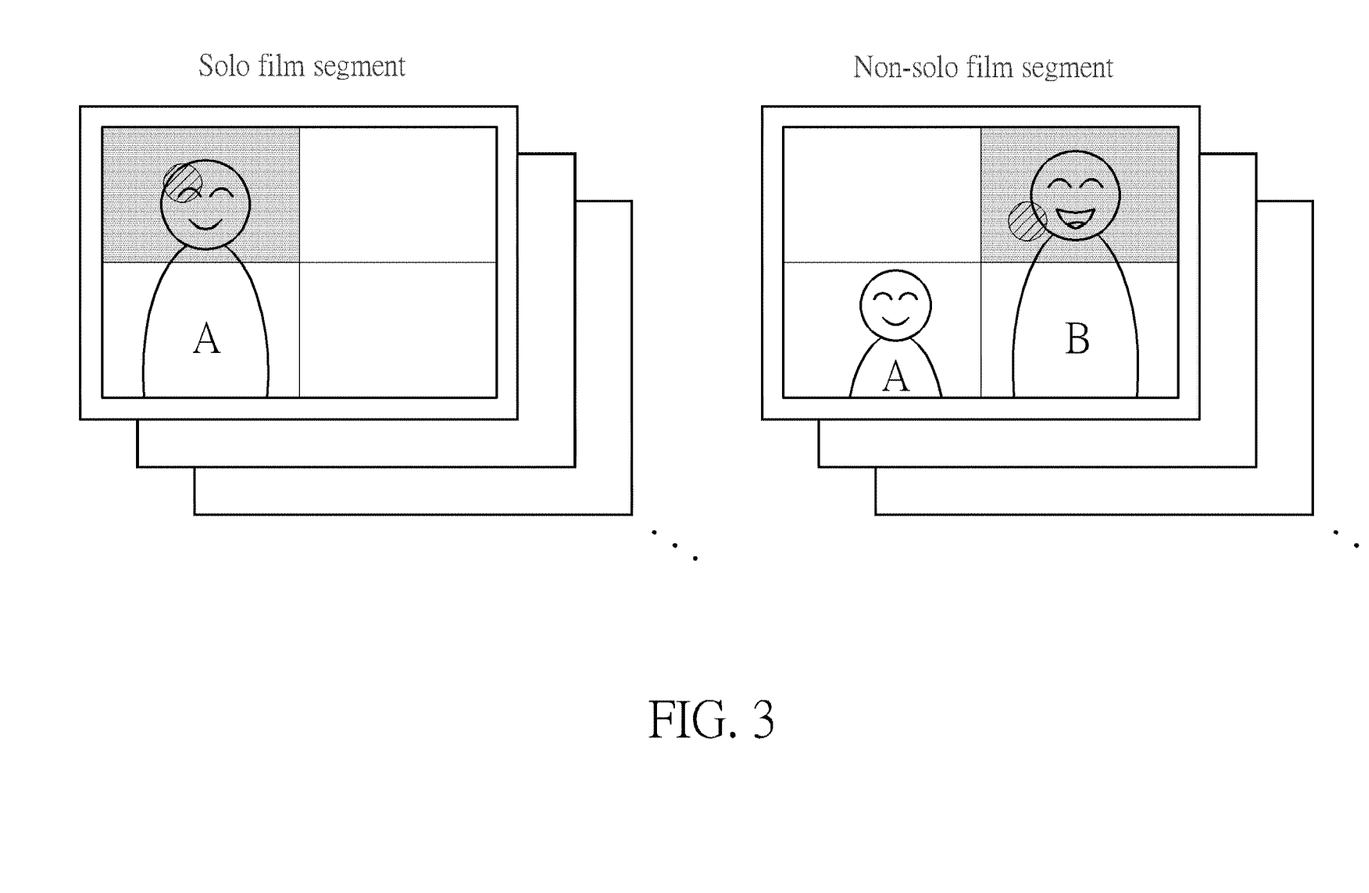
FIG. 3 illustrates an operating context of the eye tracking system in FIG. 1 according to an embodiment of the present invention.

FIG. 2 and FIG. 3 illustrates an operating context of the eye tracking system to perform visual utility analytic process according to an embodiment of the present invention, respectively. In this embodiment, before playing the film, the processing device 14 may perform visual analytic to the film by executing a deep learning algorithm (e.g., establish an artificial neural network to execute deep learning face recognition); for example, determine the film segments F1-FN of the film showing the display target, and recognize associated information of the display target, such as how many acting personnel are there in the film segment, names of the acting personnel, and coordinates and areas of the acting personnel showing on the screen 10.

In one embodiment, the processing device 14 may divide each of the film segments F1-FN (e.g., a display range of the screen 10) into at least one display area, wherein each of the film segments F1-FN corresponds to at least one display target, and the at least one display target respectively corresponds to one of the at least one display area.

In general, the visual composition guideline proposes that an image should be imagined as divided into nine equal parts by two equally spaced horizontal lines and two equally spaced vertical lines (also known as rule of thirds), and the display target should be placed at their intersections. Accordingly, in this embodiment, the display range of the screen 10 is divided into four display areas A1, A2, A3 and A4.

As shown in FIG. 2, before playing the film, the processing device 14 may determine the acting personnel shows in the display area A1 on the up-left corner of the screen 10. When the screen 10 is playing the film segment FX, the eye detecting device 12 may instantly generate the eye detection result EX to the processing device 14, and the processing device 14 accordingly determines the watched area corresponding to the watched coordinate WX is the display area A2 on the up-right corner of the screen 10. In this embodiment, the processing device 14 determines that the display area A1 corresponding to the display target TX is different from the watched area A2 corresponding to the watched coordinate WX, thereby determines that the visual utility UX of the display target TX is invalid (i.e., the viewer does not watch the acting personnel when watching the film segment FX). Noticeably, by dividing the display range of the screen 10 into at least one display area, a misjudge of visual utility due mapping error between the watched coordinate of the eye detection result and the display coordinate of the display target can be avoided.

As shown in FIG. 3, after the film ended, the processing device 14 may determine a total watched rate and a non-solo watched rate of at least one of the display targets according to the visual utilities U1-UN. The total watched rate is a ratio of a total watched time and a total show-up time, and the non-solo watched rate is a ratio of a non-solo watched time and a non-solo show-up time, wherein the total show-up time includes solo and non-solo show-up times.

In detail, the processing device 14 may count the total watched time of the acting personnel (i.e., a sum of watched times in solo film segment and non-solo film segment) according to the valid visual utility among the visual utilities U1-UN. By counting the ratio of the total watched time and the total show-up time (i.e., total play time of all the film segments F1-FN), the processing device 14 may obtain the total watched rate of the acting personnel. Specifically, when the film segment FX of the film segments F1-FN shows a sole display target, the film segment FX is a solo film segment, a solo show-up time is a total time of all the film segment FX among the film segments F1-FN, and the solo watched time is a total time of the solo film segments with valid visual utility among the film segments F1-FN.

In addition, the processing device 14 may count the non-solo show-up time of the acting personnel (i.e., a total play time of non-solo film segments) when the acting personnel shows up with another acting personnel according to the visual utilities U1-UN with valid visual utility. By counting the ratio of the non-solo watched time and the non-solo show-up time, the processing device 14 may obtain the non-solo watched rate of the acting personnel. In detail, when the film segment FX of the film segments F1-FN includes a plurality of display targets, the film segment FX is a non-solo film segment, the non-solo show-up time is a total time of all the non-solo film segment among the film segments F1-FN, and the non-solo watched time is a total time of all the non-solo film segment with valid visual utility among the film segments F1-FN.

For example, the following Table 1 is an exemplary of visual utility analytic, comparing the visual utility analytic results of the acting personnel A and B shows that the total watched rate of the acting personnel A is same as the total watched rate of the acting personnel B, but the non-solo watched rate of the acting personnel A is greater than the non-solo watched rate of the acting personnel B. As can be seen, when the acting personnel A and B simultaneously shows up in the screen, more viewers watched the acting personnel A, and thus the visual contribution (popularity) of the acting personnel A is the highest. In addition, the total watched rate and the non-solo watched rate of the acting personnel C are the lowest, and thus the visual contribution of the acting personnel C is the lowest.

TABLE 1

| | Total watched time | Total watched rate | Non-solo watched time | Non-solo watched rate |
|---|---|---|---|---|
| Acting personnel A | 38.3 seconds | 38.3/61 = 63% | 24.3 seconds | 24.3/45 = 54% |
| Acting personnel B | 32.0 seconds | 32.0/51 = 63% | 20.5 seconds | 20.5/39 = 53% |
| Acting personnel C | 15.5 seconds | 15.5/31 = 50% | 8.0 seconds | 8.0/23 = 35% |

Therefore, the eye tracking system 1 may evaluate the visual utility of the display target based on viewer's direct responses, which allows the film maker to make reference to the visual utility to evaluate the popularity and the contribution of the display target.

Figure 4:
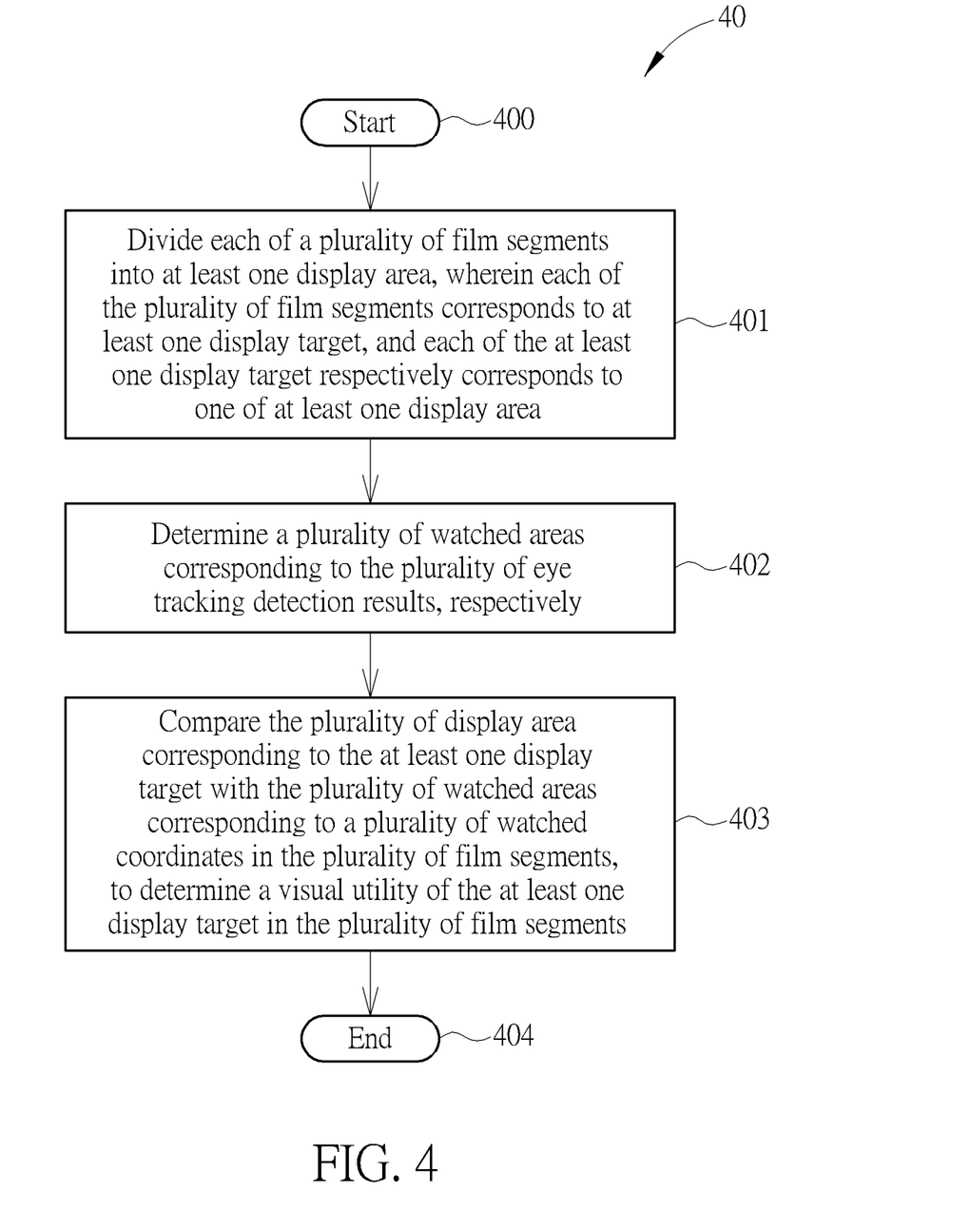
FIG. 4 is a flow chart of a visual utility analytic process according to an embodiment of the present invention.

Operations of the eye tracking system 1 may be summarized into a process 40, as shown in FIG. 4, the process 40 may be stored into a memory device for instructing the processing device 14 to execute a visual utility analytic process. The process 40 includes the following steps.

Step 400: Start.

Step 401: Divide each of a plurality of film segments into at least one display area, wherein each of the plurality of film segments corresponds to at least one display target, and each of the at least one display target respectively corresponds to one of at least one display area.

Step 402: Determine a plurality of watched areas corresponding to the plurality of eye tracking detection results, respectively.

Step 403: Compare the plurality of display area corresponding to the at least one display target with the plurality of watched areas corresponding to a plurality of watched coordinates in the plurality of film segments, to determine a visual utility of the at least one display target in the plurality of film segments.

Step 404: End.

Detailed operations of the process 40 may be obtained by referring to descriptions regarding FIG. 1 to FIG. 3, which is omitted.

To sum up, the eye tracking system of the present invention can compare whether the display area of the watched target is same as the watched area of viewer to evaluate the visual utility of the display target (e.g., acting personnel, commercial product and story plot) in the film based on viewer's direct responses, so the film maker and the advertiser can make reference to the visual utility to evaluate the popularity and the contribution of the display target.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A visual utility analytic method for an eye tracking system, wherein the eye tracking system comprises a screen and an eye detecting device, comprising:
   displaying, on the screen, media content comprising a plurality of film segments, wherein each of the plurality of film segments corresponds to at least one display target, and wherein each of the plurality of film segments are evenly divided into a plurality of display areas;
   for each of the plurality of film segments:
      associating each of the at least one display targets of the film segment with one of the plurality of display areas;
      determining, by the eye detecting device, watched coordinates within the film segment viewed by a user;
      determining, based on the watched coordinates, a watched area of the film segment corresponding to one of the plurality of display areas;
      comparing the display areas associated with each of the at least one display targets with the watched area;
      determining a visual utility of each of the at least one display targets based on the comparing;
   wherein determining the visual utility of each of the at least one display targets further comprises:
      determining a valid visual utility of a respective one of the at least one display targets when the display area associated with the respective one of the at least one display targets is the same as the watched area of a respective film segment; and
      determining an invalid visual utility of a respective one of the at least one display targets when the display area associated with the respective one of the at least one display targets is different from the watched area of a respective film segment; and evaluating a popularity score and a contribution score of each of the at least one display targets based on the determined visual utility of each of the at least one display targets.

2. The method of claim 1, further comprising:
determining the one of the plurality of display areas corresponding to the at least one display target according to a plurality of display coordinates on the screen and corresponding to the at least one display target in the plurality of film segments.

3. The method of claim 1, further comprising: determining at least one of a total watched rate and a non-solo watched rate of each of the at least one display targets according to the plurality of visual utilities, wherein the total watched rate is a ratio of a total watched time and a total show-up time, and the non-solo watched rate is a ratio of a non-solo watched time and a non-solo show-up time, wherein the total show-up time includes a solo show-up time and a non-solo show-up time of a respective one of the at least one display targets.

4. The method of claim 3, wherein when a film segment of the plurality of film segments comprises a sole display target, the film segment is a solo film segment, a solo show-up time is a total time of all the solo film segment among the plurality of film segments, and the solo watched time is a total time of all the solo film segment with valid visual utility among the plurality of film segments.

5. The method of claim 3, wherein when a film segment of the plurality of film segments comprises a plurality of display targets, the film segment is a non-solo film segment, the non-solo show-up time is a total time of all the non-solo film segment among the plurality of film segments, and the non-solo watched time is a total time of all the non-solo film segment with valid visual utility among the plurality of film segments.

6. The method of claim 1, further comprising:
performing a deep learning algorithm to the film to determine the plurality of film segments comprising the at least one display target in the film.

7. An eye tracking system, for performing a visual utility analytic process, comprising:
a screen for displaying a plurality of film segments, wherein each of the plurality of film segments corresponds to at least one display target, and evenly dividing each of the plurality of film segments into a plurality of display areas;
an eye detecting device for respectively generating a plurality of eye tracking detection results when the screen is playing the plurality of film segments; and
a processing device coupled to the screen and the eye detecting device, for performing the visual utility analytic process according to the plurality of film segments and the plurality of eye tracking detection results, to determine a plurality of visual utilities, wherein the process comprises:
for each of the plurality of film segments:
associating each of the at least one display targets of the film segment with one of the plurality of display areas;
determining, by the eye detecting device, watched coordinates within the film segment viewed by a user;
determining, based on the watched coordinates, a watched area of the film segment corresponding to one of the plurality of display areas;
comparing the display areas associated with each of the at least one display targets with the watched area;
determining a visual utility of each of the at least one display targets based on the comparing;
wherein determining the visual utility of each of the at least one display targets further comprises:
determining a valid visual utility of a respective one of the at least one display targets when the display area associated with the respective one of the at least one display targets is the same as the watched area of a respective film segment; and
determining an invalid visual utility of a respective one of the at least one display targets when the display area associated with the respective one of the at least one display targets is different from the watched area of a respective film segment; and
evaluating a popularity score and a contribution score of each of the at least one display targets based on the determined visual utility of each of the at least one display targets.

8. The system of claim 7, wherein the process further comprises:
determining the one of the plurality of display areas corresponding to the at least one display target according to a plurality of display coordinates on the screen and corresponding to the at least one display target in the plurality of film segments.

9. The system of claim 7, wherein the process further comprises: determining at least one of a total watched rate and a non-solo watched rate of each of the at least one display targets according to the plurality of visual utilities, wherein the total watched rate is a ratio of a total watched time and a total show-up time, and the non-solo watched rate is a ratio of a non-solo watched time and a non-solo show-up time, wherein the total show-up time includes a solo show-up time and a non-solo show-up time of a respective one of the at least one display targets.

10. The system of claim 9, wherein when a film segment of the plurality of film segments comprises a sole display target, the film segment is a solo film segment, a solo show-up time is a total time of all the solo film segment among the plurality of film segments, and the solo watched time is a total time of all the solo film segment with valid visual utility among the plurality of film segments.

11. The system of claim 9, wherein when a film segment of the plurality of film segments comprises a plurality of display targets, the film segment is a non-solo film segment, the non-solo show-up time is a total time of all the non-solo film segment among the plurality of film segments, and the non-solo watched time is a total time of all the non-solo film segment with valid visual utility among the plurality of film segments.

12. The system of claim 7, wherein the processing device is further used performing a deep learning algorithm to the film to determine the plurality of film segments comprising the at least one display target in the film.

13. The system of claim 7, wherein the processing device is integrated with at least one of the screen and the eye detecting device.

14. An electronic device, for an eye tracking system, for performing a visual utility analytic process, wherein the eye tracking system comprises a screen and an eye tracking device, comprising:
a processing device; and
a memory device coupled to the processing device for storing a program code, wherein the program code instructs the processing device to perform the visual utility analytic process according to a plurality of film segments displayed by the screen and a plurality of eye tracking detection results generated by the eye tracking device to determine a plurality of visual utilities, wherein the process comprises:
displaying, on the screen, media content comprising a plurality of film segments, wherein each of the plurality of film segments corresponds to at least one display target, and wherein each of the plurality of film segments are evenly divided into a plurality of display areas;
for each of the plurality of film segments:
  associating each of the at least one display targets of the film segment with one of the plurality of display areas;
  determining, by the eye detecting device, watched coordinates within the film segment viewed by a user;
  determining, based on the watched coordinates, a watched area of the film segment corresponding to one of the plurality of display areas;
  comparing the display areas associated with each of the at least one display targets with the watched area;
  determining a visual utility of each of the at least one display targets based on the comparing;
wherein determining the visual utility of each of the at least one display targets further comprises:
  determining a valid visual utility of a respective one of the at least one display targets when the display area associated with the respective one of the at least one display targets is the same as the watched area of a respective film segment; and
  determining an invalid visual utility of a respective one of the at least one display targets when the display area associated with the respective one of the at least one display targets is different from the watched area of a respective film segment; and
evaluating a popularity score and a contribution score of each of the at least one display targets based on the determined visual utility of each of the at least one display targets.

15. The electronic device of claim 14, wherein the process further comprises:
  determining the one of the plurality of display areas corresponding to the at least one display target according to a plurality of display coordinates on the screen and corresponding to the at least one display target in the plurality of film segments.

16. The electronic device of claim 14, wherein the process further comprises: determining at least one of a total watched rate and a non-solo watched rate of each of the at least one display targets according to the plurality of visual utilities, wherein the total watched rate is a ratio of a total watched time and a total show-up time, and the non-solo watched rate is a ratio of a non-solo watched time and a non-solo show-up time, wherein the total show-up time includes a solo show-up time and a non-solo show-up time of a respective one of the at least one display targets.

17. The electronic device of claim 16, wherein when a film segment of the plurality of film segments comprises a sole display target, the film segment is a solo film segment, a solo show-up time is a total time of all the solo film segment among the plurality of film segments, and the solo watched time is a total time of all the solo film segment with valid visual utility among the plurality of film segments.

18. The electronic device of claim 16, wherein when a film segment of the plurality of film segments comprises a plurality of display targets, the film segment is a non-solo film segment, the non-solo show-up time is a total time of all the non-solo film segment among the plurality of film segments, and the non-solo watched time is a total time of all the non-solo film segment with valid visual utility among the plurality of film segments.

19. The electronic device of claim 16, wherein the processing device is further used for performing a deep learning algorithm to the film to determine the plurality of film segments comprising the at least one display target in the film.

* * * * *